Oct. 16, 1962  H. WAGNER  3,058,368
STEERING LOCKING MECHANISM FOR MOTOR
VEHICLES, PARTICULARLY TRACTORS
Filed July 2, 1959
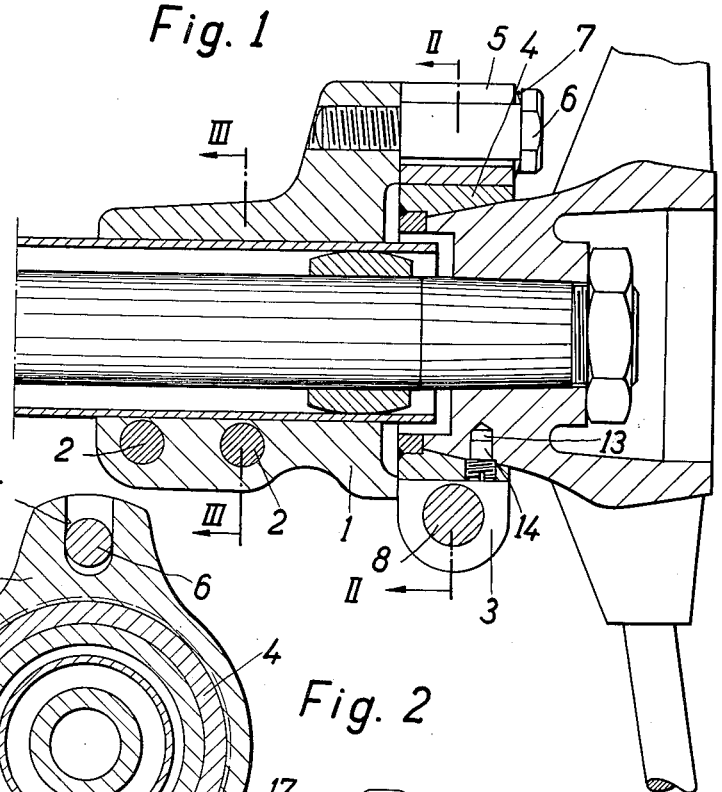
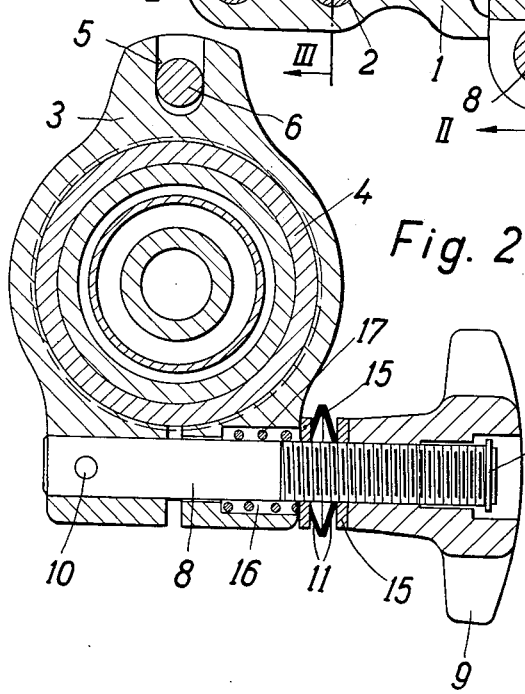
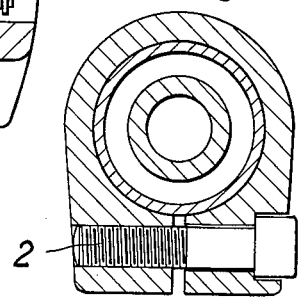
Inventor:
HEINRICH WAGNER
by: Albert M Zalkind

United States Patent Office 3,058,368
Patented Oct. 16, 1962

3,058,368
STEERING LOCKING MECHANISM FOR MOTOR VEHICLES, PARTICULARLY TRACTORS
Heinrich Wagner, Schwabisch Gmund, Germany, assignor to Zahnradfabrik Friedrichshafen, Aktiengesellschaft, Friedrichshafen am Bodensee, Germany
Filed July 2, 1959, Ser. No. 824,674
Claims priority, application Germany July 19, 1958
10 Claims. (Cl. 74—495)

This invention relates to locking devices and more particularly to locking devices of the brake type for holding the steering rod of a vehicle in fixed position.

It is desirable, in the operation of tractors, when working in fields, to be able to lock the steering rod so that the tractor will follow a predetermined course to free the driver for certain other operations. However, such locking device should permit the driver to vary the steering at will and without any impediment.

I am aware that various arrangements for locking steering rods to effect predetermined steering have heretofore been known. However, such prior devices have had certain drawbacks in that infinitely variable rotation of the steering rod is not possible. In other words, one such prior device utilizes a mechanism which comprises a notched element and so, of course, the steering rod can only be set at angles determined by the spacing between notches. Another type of steering rod lock of which I am aware uses a friction brake principle, as does my present invention, but in the instance of the prior art device, considerable reconstruction of the steering rod and its attendant components, such as the steering column, etc., is required. In short, it is necessary to dismantle the steering assembly comprising the wheel, steering rod, etc., in order to apply such prior art devices and, in fact, the usual bearing found between the steering column and the steering shaft must be omitted in re-assembling such devices.

It is an object of the present invention to provide a steering rod lock which overcomes the difficulties hereinabove pointed out in connection with prior art devices and at the same time furnish a simple, rugged, and economical mechanism for achieving the desired locking effect. In particular, it is an object of my invention to provide a device which can be applied to a steering wheel and steering column entirely externally and with a minimum of machining or fitting operations.

In general, I accomplish the objects hereinabove mentioned by providing a brake ring which may be easily secured to a steering wheel hub by drilling and threading one or more holes therein and fastening the brake ring thereto by screws. This is the only modification necessary for applying my invention to a standard steering wheel arrangement. A braking collar is utilized which is engaged by a flanged arrangement to the steering column. The braking collar encompasses the brake ring secured to the hub and is sufficiently flexible so that it can be compressed by a hand-rotated knob and threaded arrangement to grip the brake ring. Thus, the steering wheel is effectively locked in any desired position to the steering column. No disassembly of the steering mechanism is required except for removal of the steering wheel for the purpose of applying the brake ring.

My invention will now be described in detail in conjunction with the drawing, in which:

FIG. 1 is a longitudinal cross-section through a steering column and associated parts, including the components of the invention.

FIG. 2 is a section through 2—2 of FIG. 1.
FIG. 3 is a section through 3—3 of FIG. 1.

Referring now to the drawing, the usual steering column, steering rod, and steering wheel, together with a bearing between the rod and the column is shown, such components not being numbered inasmuch as they are clearly recognizable as being of conventional nature. Attached to the hub of the steering wheel is a brake ring 4, which brake ring may be secured by one or more screws such as 14 having threaded engagement within bores 13 which are provided in the hub. Thus, the steering wheel may be removed and after being suitably drilled and threaded, the brake ring is applied and the screws 13 set in place to key the brake ring in position on the hub. It will be noted that the brake ring is provided with a suitable internal taper generally conforming to the taper of the hub.

Surrounding the brake ring and grippingly engageable therewith is a brake collar 3, which terminates in a slotted upper formation as indicated at 5 for accommodating a bolt 6 which passes through the slot and into a support flange 1 which will be understood to be secured to the steering column as by bolts 2. The slot 5 is provided to compensate for any lack of concentricity between the steering rod and the steering column. A disk spring 7 is utilized between the bolt head and the slotted formation of the brake ring to eliminate any undesirable rattling or vibration of the brake collar 3.

Thus, the support flange 1 may be split at its bottom and be of suitably resilient metal such that bolts 2 can narrow the bottom gap and effects securing gripping of the support flange on the steering column. Obviously, the support flange may be slipped onto the column at the time that the steering wheel is removed for drilling of the hub.

The brake collar 3 is split at its lower end and is bored to take a pin 8 fastened against rotation as by a pin 10, which pin 8 is threaded at its outer portion for co-action with a hand-rotated knob 9. The knob 9, carried on the threaded portion of pin 8, is retained thereon as by a retaining clip 12 and it will be apparent that rotation of the knob is capable of compressing a pair of oppositely disposed disk springs 11 between a pair of pressure disks 15, as shown. Thus, with the understanding that the brake collar is of sufficiently resilient metal such that the gap at the bottom can be narrowed by pressure exerted by knob 9, it will be apparent that such rotation of the knob will effect a tight squeeze of the brake collar 3 on the brake ring 4 and in that manner securely grip the brake ring to lock the steering wheel in any desired position.

In order to prevent unintentional rotation of knob 9 by inadvertent contact with the operator's hand, tools, etc., a spring 17 is provided housed in a suitable recess surrounding the pin 8, which spring bears compressively against the combination of the pressure disks 15 and disk springs 11. Such compressive stress maintains a steady force on the knob so that friction between the threads on the knob and the threads of pin 8 will maintain the knob in relatively fixed position relative the pin, but which frictional force is readily overcome by manual force for tightening or loosening the knob.

It will be noted that the arrangement shown is such that any degree of gripping engagement can be effected between the brake collar and the brake ring. Thus, if desired, the gripping engagement can be such that the tractor will be held to steering a steady course, yet the steering wheel can be swung by exertion of sufficient manual force to vary such course without the necessity for loosening the knob 9.

Having thus described my invention, I am aware that various changes may be made without departing from the spirit thereof and, accordingly, I do not seek to be limited to the precise illustration herein given except as set forth in the following claims.

I claim:
1. In a steering lock for motor vehicles, a combination of a brake element for attachment to a steering wheel hub, a brake collar for attachment to a steering column, and attaching means for attaching said brake collar to said column and affording a degree of free radial motion relative to the said column to compensate for radial eccentricity between said column and said hub, and manually operable means for radially compressing said collar to grip said brake element, wherein said brake element is exteriorly disposed relative to said hub and said column.

2. A lockable steering wheel device, comprising in combination a rotative steering wheel having a hub; a fixed steering column generally concentric with said hub; a brake element concentrically carried on said hub and rotative therewith, and a second brake element secured to said steering column, means securing said second brake element to said steering column with a predetermined degree of relative radial motion with respect to said column to compensate for lack of radial concentricity between said column and said hub, including manually operable means for forcing said brake elements into gripping engagement.

3. In a steering lock for motor vehicles having a steering column and a steering wheel having a hub; a brake ring secured concentrically on said hub and a brake collar surrounding said brake ring and secured to said column and having a limited degree of radial motion relative to said column to compensate for the lack of radial concentricity between said column and said hub and manually operable means for effecting a frictional locking engagement between said ring and collar.

4. In a steering lock for motor vehicles having a steering column and a steering wheel having a hub, a brake ring secured to said hub, means for securing said brake ring to said hub comprising screw means passing through said brake ring and having threaded engagement in said hub, said brake collar surrounding a brake ring, said collar being split at one point to effect a gap, a pin passing through said collar and across said gap, a knob carried by said pin and having threaded engagement therewith, means whereby rotation of said knob effects closure movement of said brake collar to grippingly engage said brake ring, and means for securing said brake collar to said steering column and affording limited radial motion with respect thereto to compensate for lack of radial concentricity between said hub and said column.

5. In a steering lock for motor vehicles having a steering column and a steering wheel having a hub, a flange support carried exteriorly of said steering column and secured thereto, a brake collar engaged by said flange support and having limited radial motion with respect to said column to compensate for lack of radial concentricity between said column and said hub, a brake ring carried by and non-rotatively secured to said hub, and means for compressing said brake collar on said brake ring.

6. In a steering lock for motor vehicles having a steering column and a steering wheel having a hub, support means carried by said column, a brake collar engaged by said support means and having limited radial motion with respect to said column to compensate for lack of radial concentricity between said column and said hub, a brake ring carried by said hub and disposed within said collar, said collar being formed with a gap and screw means for taking up said gap to effect gripping of said collar on said ring, said screw means comprising a screw member carried by said collar and passing through said gap, a knob on said screw member threadedly co-acting therewith and resilient means intermediate an end of said knob and said collar through which reaction stress is transmitted as said knob is rotated to take up said gap.

7. In a steering lock for motor vehicles having a steering column and a steering wheel having a hub, support means carried by said column, a frictional brake collar engaged by said support means, a frictional brake ring carried by said hub and disposed within said collar, said collar being formed with a gap and screw means for taking up said gap to effect gripping of said collar on said ring, said screw means comprising a screw member carried by said collar and passing through said gap, a knob on said screw member threadedly co-acting therewith and resilient means intermediate an end of said knob and said collar through which reaction stress is transmitted as said knob is rotated to take up said gap, compressive spring means carried by said collar and having an end abutting said collar and another end abutting said resilient means for effecting a constant frictional holding engagement between said knob and said screw means.

8. In a steering lock for motor vehicles having a steering rod, a steering column, and a steering wheel having a hub, a brake ring carried by said hub and secured thereto, a brake collar surrounding said brake ring and grippingly engageable therewith, and means for supporting said brake collar on said column comprising a support element secured to said column, said brake collar having a slot, a bolt passing through said slot and having threaded engagement in said support means whereby said brake collar may have limited motion relative said column to compensate for any lack of concentricity between said steering rod and said steering column.

9. In a steering lock for motor vehicles having a steering column and a steering wheel, a frictional brake element carried by said wheel, a generally concentric frictional brake element carried by said column, and movable connection means intermediate said latter brake element and said column permitting limited motion of said latter element in a radial direction relative said column to compensate for lack of concentricity between said column and said wheel.

10. In a steering lock as set forth in claim 9, said means comprising a support member for said one brake element and having a radial slot, and a pin-like element passing through said slot and radially movable therein and securing said one brake element to said support member.

11. In a steering lock for motor vehicles having a steering column and a steering rod and a steering wheel means secured to said rod, a pair of ring-like brake elements, one such element being secured substantially non-rotatively with respect to said rod, the other of said elements being secured substantially non-rotatively with respect to said column, means for effecting mutual gripping of said elements to lock said rod non-rotatively with respect to said column, and means for effecting limited radial freedom of movement of said elements with respect to each other to compensate for radial eccentricity between said rod and said column.

References Cited in the file of this patent

UNITED STATES PATENTS

| | | |
|---|---|---|
| 759,726 | Maxim | May 10, 1904 |
| 886,938 | Brush | May 5, 1908 |
| 1,220,104 | Hanten | Mar. 20, 1917 |
| 1,320,557 | Koepke | Nov. 4, 1919 |
| 1,338,351 | Blankinship et al. | Apr. 27, 1920 |
| 1,448,634 | Mettenburg | Mar. 13, 1923 |
| 1,804,333 | Gregoire | May 5, 1931 |
| 1,833,746 | Hall | Nov. 24, 1931 |